Figure 5:
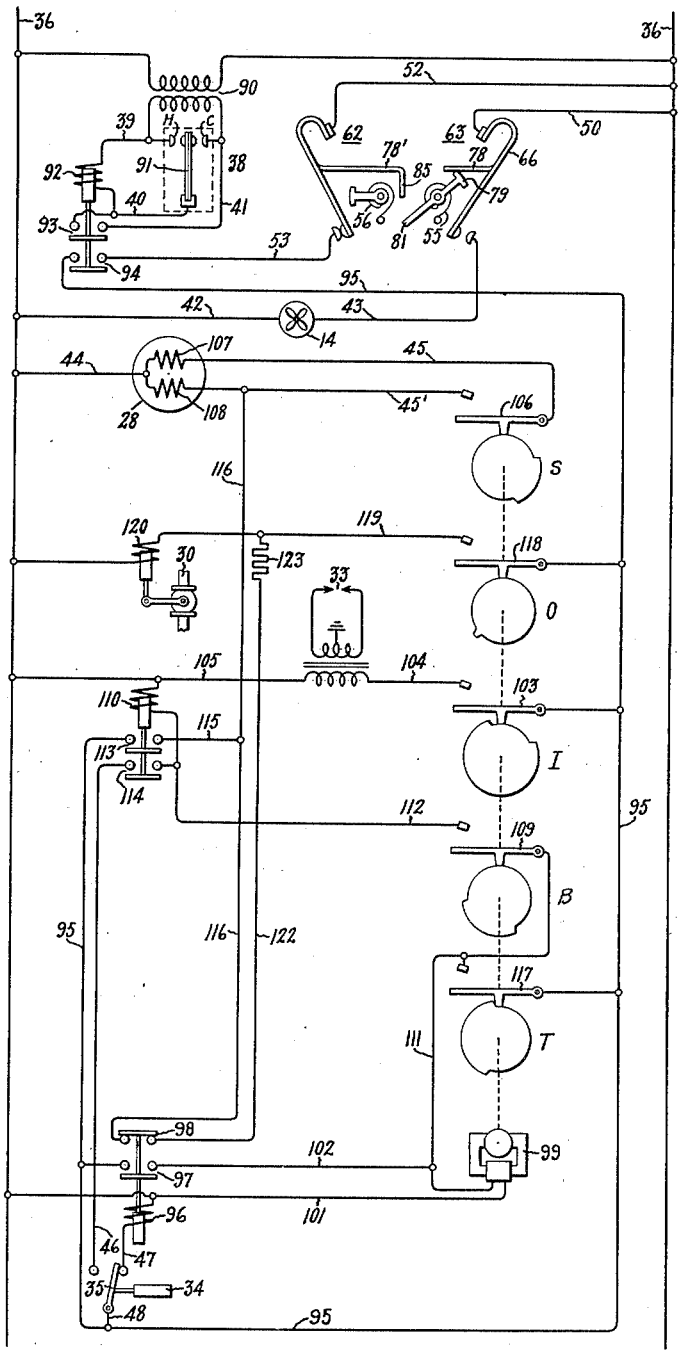

Nov. 8, 1938.       H. R. CRAGO       2,136,235
TEMPERATURE CONTROL SYSTEM
Filed Nov. 25, 1936       3 Sheets-Sheet 1
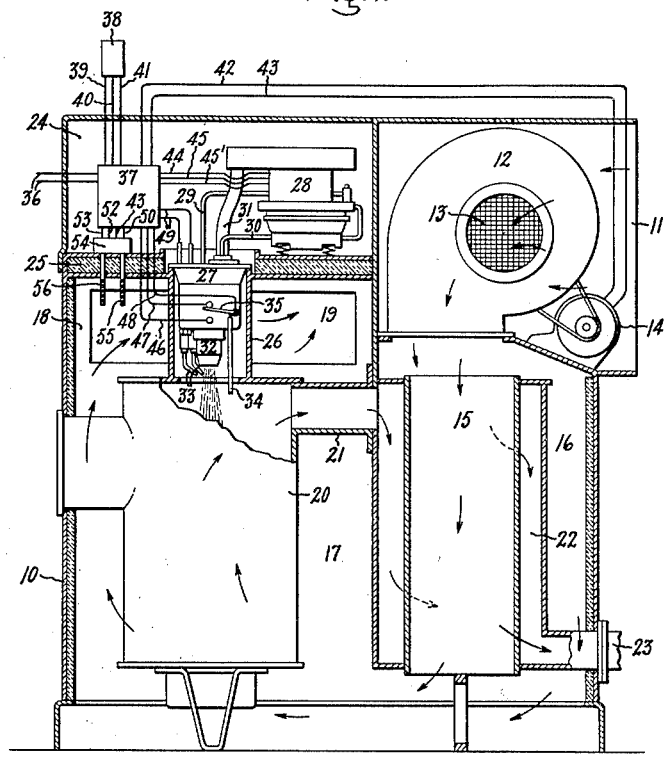
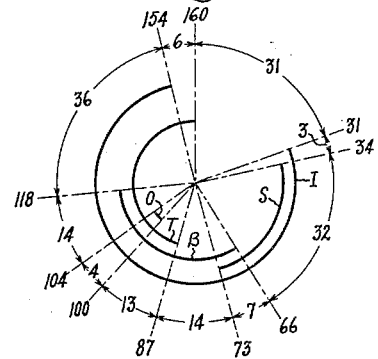
Inventor:
Harry R. Crago,
by Harry E. Dunham
His Attorney.

Nov. 8, 1938.  H. R. CRAGO  2,136,235
TEMPERATURE CONTROL SYSTEM
Filed Nov. 25, 1936  3 Sheets-Sheet 2
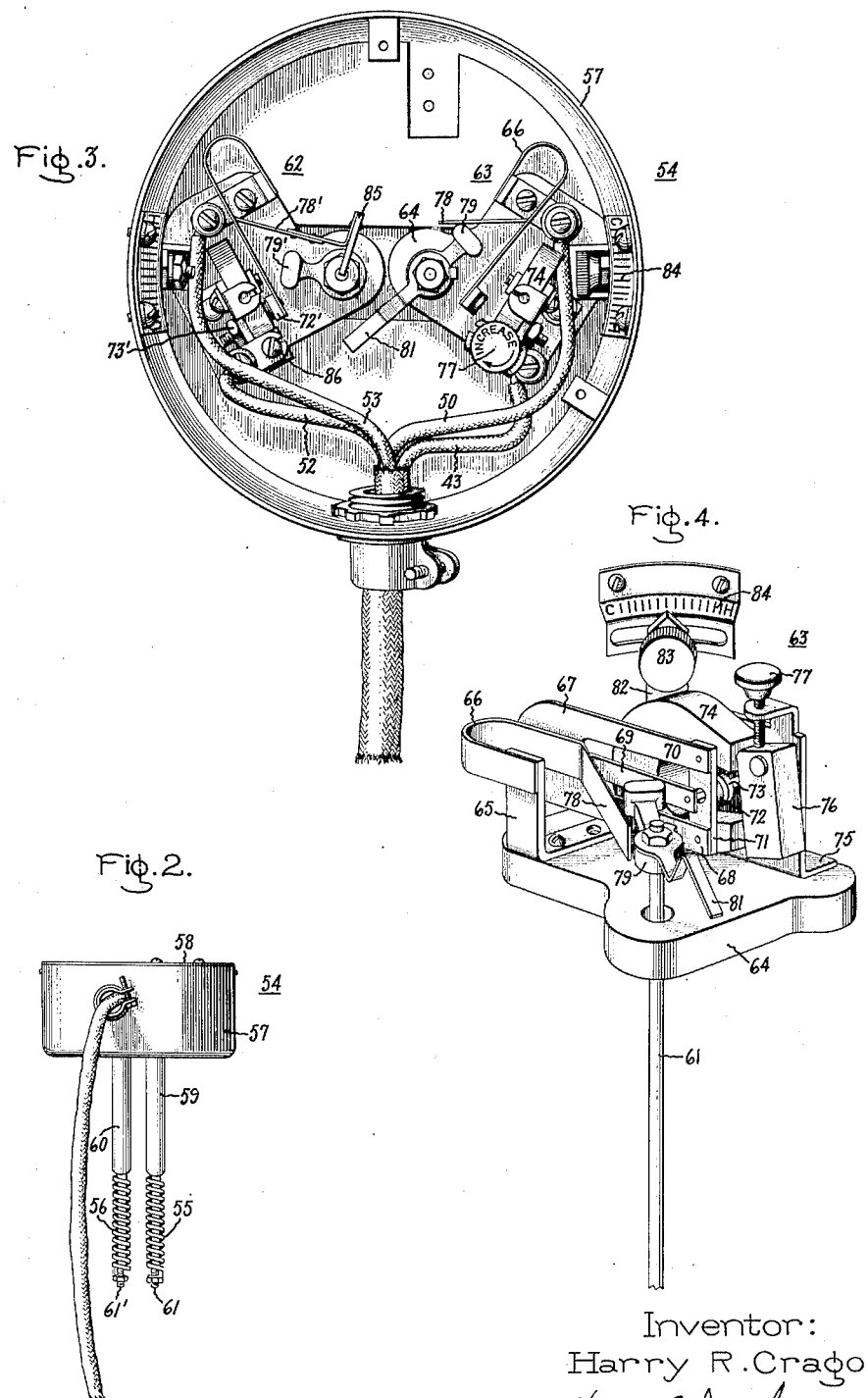
Inventor:
Harry R. Crago,
by Harry E. Dunham
His Attorney.

Nov. 8, 1938.  H. R. CRAGO  2,136,235

TEMPERATURE CONTROL SYSTEM

Filed Nov. 25, 1936   3 Sheets—Sheet 3

Inventor:
Harry R. Crago,
by Harry E. Dunham
His Attorney.

Patented Nov. 8, 1938

2,136,235

UNITED STATES PATENT OFFICE 2,136,235

TEMPERATURE CONTROL SYSTEM

Harry R. Crago, Caldwell, N. J., assignor to General Electric Company, a corporation of New York Application November 25, 1936, Serial No. 112,683

12 Claims. (Cl. 236—11)

The present invention relates to temperature control systems and particularly to warm air heating systems provided with air circulating means such as a fan or the like for securing a forced circulation of air through the furnace into the enclosure to be conditioned.

Warm air heating systems are customarily provided with a control including a room thermostat, and thermally actuated fan and high limit switches. The control of the temperature changing means and air circulating means by these various elements usually is so correlated that the room thermostat initiates operation of the temperature changing means and after the air has been heated to a predetermined minimum temperature the fan switch is actuated to initiate operation of the fan to supply heated air to the enclosure being conditioned. If the air temperature reaches an excessive value the limit switch is actuated to terminate operation of the temperature changing means until the temperature decreases to a safe value.

It is the main object of the present invention to provide a control system of the above type with an additional safeguard to prevent continued operation of the temperature changing means upon occurrence of excessive temperatures.

More specifically, it is an object of the present invention to provide a control in which the thermal responsive actuating means for the fan switch is adapted also to open the high limit switch in case the thermal actuating means for the latter fails to open for any reason whatever. In other words, it is the primary object of the present invention to provide a warm air furnace control with double excess temperature protection.

A further object of the present invention is to provide a temperature control device mounting a pair of thermally actuated switches each actuated by its respective thermal responsive element under normal operating conditions and both adapted to be actuated by a predetermined one thereof under abnormal conditions.

Further objects and advantages of my invention will become apparent as the following description proceeds, and the features of novelty which characterize my invention will be pointed out with particularity in the claims annexed to and forming part of this specification.

For a better understanding of my invention reference may be had to the accompanying drawings in which Fig. 1 is a side elevation, partially in section, of a warm air furnace showing the location of the various parts thereof; Fig. 2 is a side view of the assembled fan and limit control as it appears when assembled for insertion into the plenum chamber of the warm air furnace; Fig. 3 is a top view of the fan and limit control; Fig. 4 is a perspective view of the fan switch illustrated in Fig. 3 with the casing and bimetallic actuating element omitted; Fig. 5 is a schematic representation of a control circuit embodying the invention for a warm air furnace, and Fig. 6 is a sequence diagram for the control system illustrated in Fig. 5.

Referring to Fig. 1, reference numeral 10 indicates a warm air furnace provided with an air inlet 11 to which air may be supplied either in whole or in part from the enclosure being conditioned or from outdoors. The air enters a fan scroll or casing 12 through inlet openings 13 (only one of which is shown) and is discharged downwardly by air circulating means driven by motor 14. The air flows in the direction indicated by the arrows through passages 15 and 16 and thereafter is deflected upwardly by the bottom of the furnace and passes upwardly through a cylindrical passage 17 to a plenum chamber 18 and thence through warm air outlets 19 (only one of which is shown) to the enclosure being conditioned.

The temperature of the air passing through the furnace is changed by a primary heat exchanger consisting of a combustion chamber 20 connected at its upper end by a tubular portion 21 to the secondary heat exchanger including the aforementioned air passages 15 and 16 and flue passage 22. From the latter the combustion products pass through a chimney connection 23 to a chimney and thence to the outdoors.

A compartment 24, provided above the plenum chamber for the various controls and fuel and air injecting apparatus, is thermally insulated from the primary heat exchanger by a partition 25. Extending downwardly from the compartment 24 and suspended on a tubular supporting member 26 extending into an opening formed in partition 25 is a burner head 27 to which fuel and air are supplied by a motor-compressor 28. The burner head may be of a type disclosed in Letters Patent No. 2,048,495—Lum et al. and assigned to the assignee of the present application. A motor-compressor 28 supplies atomizing air to the burner head through a conduit 29, fuel through a conduit 30 and secondary combustion air through a conduit 31. These ingredients are supplied in amounts proportioned to produce a combustible mixture which is directed downwardly through a nozzle 32 into the combustion chamber 20 where the mixture is ignited by a pair of ignition electrodes 33. The burner head unit also mounts a flame detector including a thermal responsive member 34 and a movable contact 35 actuatable thereby from a normal start position to a run position upon establishment of combustion, as will be described in greater detail hereinafter.

The control apparatus, which will be described in greater detail in connection with Figs. 5 and 6, is supplied with electrical energy through a pair of supply conductors 36 leading to a master control illustrated diagrammatically at 37. The master control, with exception of the fan and limit control of my invention which is to be described in greater detail hereinafter, forms the basis of an application of John Eaton, Serial No. 735,103, filed July 14, 1934, and also assigned to the assignee of the present invention. The operation of the furnace is controlled by a room thermostat 38 of the usual three-wire type connected to the master control by conductors 39, 40 and 41. The master control is connected to the fan motor 14 through conductors 42 and 43, to the motor-compressor through conductors 44, 45 and 45', to the flame detector through conductors 46, 47 and 48, and to the ignition electrodes by a pair of conductors 49. The master control is further connected by two pairs of conductors 43—50, and 52—53 to the fan and limit control 54 comprising a pair of thermal responsive elements 55 and 56 extending through partition 25 into the plenum chamber where they are subject to the temperature of the heated air. Elements 55 and 56 control the fan and limit switches, respectively.

The combined fan and limit switch control through which the double excess temperature protection of my invention is obtained, is illustrated in detail in Figs. 2 to 4, inclusive. The mechanism comprises a cup-shaped casing 57 provided with a removable cover 58 and a pair of downwardly extending tubes 59 and 60 securely fastened to casing 57. The thermal responsive actuating elements 55 and 56, comprising helical bimetallic elements of well known construction, are attached at their upper ends to the tubular portions 59 and 60 and at their lower ends by any suitable means to upwardly extending shafts 61 and 61', respectively, which are rotatably journaled in casing 57.

The actuating elements 55 and 56 operate magnetic snap action switches 62 and 63, respectively. These switches are practically identical in construction except for the means by which the double excess temperature protection is obtained, hereinafter to be pointed out, and their construction may be readily perceived from Figs. 3 and 4. In Fig. 4 the upwardly extending shaft 61 is illustrated as being rotatably mounted with respect to a base 64 made of insulating material and mounting by means of brackets 65 a resilient substantially U-shaped contact structure supporting means 66. The contact structure comprises a resilient member 67 suitably fastened to support 66 and provided with three fingers 68, 69 and 70. Fingers 68 and 70 carry an armature member 71 and the middle finger 69 carries a contact 72 extending through an opening in the armature and adapted to engage, as illustrated, a stationary contact 73. The movable contact is connected to conductor 50 and the fixed contact to conductor 43. Snap action of the contact on both opening and closing is provided by a permanent magnet 74 mounted on bracket 75 adapted to cooperate with the armature member 71. The temperature differential required to cause engagement and disengagement of the contacts is very readily adjusted by means of a pivotally mounted magnetic shunt member 76 also mounted on the bracket 75. The position of member 76 may be adjusted with respect to the poles of the permanent magnet by a screw 77 to increase or decrease the strength of the magnet by providing a variable shunt for the poles of the magnet.

Movement of the contact structure by rotation of shaft 61 is achieved by coaction between a projection 78 formed as an integral portion of the contact structure supporting means 66 and adapted to be engaged by an arm 79 formed of insulating material and fixedly mounted on shaft 61. Rotation of the shaft in a clockwise direction effects engagement of the contacts and rotation in the opposite or counter-clockwise direction effects opening of the contacts upon a predetermined movement of the projection 78 by the operating arm 79. Shaft 61 also mounts a projecting arm 81, extending diametrically opposite to arm 79, adapted upon occurrence of excessive temperatures to open the limit switch 62 in case the latter has not been opened by its actuating element in a manner to be explained fully hereinafter.

The temperature at which the contact mechanism is operable by the thermal actuating element may be varied by means of an adjusting arm 82 and adjusting screw 83. The arm 82 is securely fastened to the insulating base 64 so that when the screw 83 is loosened the base may be rotated and the angular position between the latter and the shaft 61 varied so that the operating arm 79 may engage the projection 78 at any selected temperature. The extent of variations is indicated by means of a scale carrying member 84 suitably fastened, as indicated, to the casing 57.

The limit switch 62 is, as has been stated previously, practically the same in construction as the fan switch 63 and differs only in the addition of a substantially T-shaped projection 85 attached to the projection 78' of the contact carrying structure of switch mechanism 62, and in the substitution of a screw 86 for the adjusting knob 77 of switch 63. The reason for this substitution is, that, once the thermostat is calibrated to operate at any particular temperature value, it is preferable that the high limit switch operate at this value in all installations. However, if it is desirable for any reason whatever to vary the temperature value at which the high limit switch operates, this may be readily done by varying the adjustment of screw 86.

The position of the fan and limit switches when the furnace is cold is indicated in Fig. 3 in which the fan switch is illustrated in its open position and the limit switch in its closed position. On an increase in temperature operating arm 79 is rotated in a clockwise direction and upon a predetermined movement the switch contacts 72 and 73 are moved into engagement, thereby initiating operation of the air circulating means as will be described more fully hereinafter. At this time the high limit switch is in its closed position as indicated, but in case the air temperature rises above a safe value the limit switch contacts 72' and 73' are opened upon actuation of projection 78' by operating arm 79'. During this time the operating arm 79 continues to move in a clockwise direction but its continued movement has no effect on the previously closed fan switch. In case the bimetallic element 56 actuating the limit switch should fail to open the high limit switch for any reason whatever then, upon a further increase in temperature and resulting further clockwise movement of projection 81 by shaft 61, projection 81 engages projection 85 and thereafter upon a continued movement effects disengagement of the high limit switch contacts 72' and 73', thereby breaking the circuit across conductors 47 and 48. The above described operation will be amplified by a consideration of the furnace control as a whole which will be considered next.

Referring now to the schematic wiring diagram illustrated in Fig. 5 and the sequence diagram for the cam contacts illustrated in Fig. 6, a detailed description of the control circuit for the furnace and air circulating means will be given. As far as possible the same reference numerals are used in Fig. 5 as were used in Figs. 1 to 4, inclusive. Electrical energy is supplied to the system through the supply conductors 36 from which low voltage energy is supplied by means of a transformer 90 to the room thermostat 38 consisting of a thermal responsive bimetallic element 91 having associated therewith a cold contact C and a hot contact H. Upon engagement of the element with the cold contact a relay 92 is energized through a circuit including conductors 40 and 39. Relay 92 is adapted to close switches 93 and 94, the former completing a holding circuit for the relay winding through conductor 41 and the later connecting conductor 95 to source 36 through conductors 52 and 53 and limit switch 62 in its closed position.

The closure of switch 94 and connection of conductor 95 to the source 36 initiates operation of the furnace by energization of a relay 96 through the flame detector switch 35 which is in its "start" position thereby closing a circuit across conductors 47 and 48. Energization of relay 96 results in the closure of switch 97 and opening of switch 98 adapted to be actuated thereby. The closure of the former results in the energization of the cam driving motor 99 through a circuit including conductors 101 and 102 connecting the motor to the supply conductors 36 and 95, respectively. Energization of the cam driving motor 99 initiates rotation of cams T, B, I, O and S, adapted to be driven thereby, controlling respectively the cam driving motor, the starting winding of the motor compressor 28, ignition transformer, the oil valve, and the running winding of the motor compressor 28.

Referring now to the sequence diagram for the cam contacts shown in Fig. 6, it will be seen that 31 seconds after the initiation of rotation of the cam shaft cam I actuates its follower arm 103 into engagement with its associated contact, thereby closing a circuit across the primary of the ignition transformer through conductors 104 and 105. A voltage is induced in the secondary winding of the transformer and sparking takes place between the ignition electrodes 33. Three seconds thereafter cam S actuates its follower arm 106 into engagement with its associated contacts thereby connecting the starting winding 107 and running winding 108 of the motor-compressor in parallel through conductors 45 and 45', respectively. The motor compressor does not start at this time because of the fact that no energizing circuit therefor has been completed, but thirty-two seconds later (sixty-six seconds from the beginning) the cam B actuates its follower arm 109 to close an energizing circuit for relay 110 and thereby effects starting of the motor compressor. The energizing circuit for this relay extends from conductor 95 through the previously closed switch 97, conductor 102, conductor 111 to the contact follower arm 109, now in circuit closing position, and conductor 112 to the relay and thence through conductor 105 to the supply conductor 36. The relay closes a pair of switches 113 and 114, the former connecting the motor compressor to conductor 95 through conductors 115 and 116 and thereby placing it in operation. Switch 114 connects conductor 112 to conductor 46 leading to the "run" contact of the flame detector and thereby conditions a holding circuit for the relay 110 for closure by the flame detector. Seven seconds later (seventy-three seconds from the start) the contacts operated by cam S open, leaving the compressor motor 28 energized through its running winding 108, the energizing circuit therefor extending through the previously described circuit. Fourteen seconds after this operation (eighty-seven seconds after the start) the contact operated by cam T is closed by movement of cam follower arm 117 into engagement with its associated contact, thereby connecting the cam motor directly across conductors 95 and 36 through conductors 111 and 101. This circuit keeps the motor running until the end of the starting cycle. Thirteen seconds after this operation (one hundred seconds after the start) cam O actuates its follower arm 118 into circuit closing position to energize the oil valve operating solenoid 120. The energizing circuit extends from conductor 95 through cam follower arm 118, conductor 119 to the valve operating solenoid 120 and thence to conductor 36.

Upon opening of the valve and supply of oil and air into the combustion chamber of the furnace as a combustible mixture then, if flame is properly established by the ignition electrodes, the flame detector switch 35 is actuated into its "run" position thereby deenergizing relay 96 and closing a circuit across conductors 46 and 48. Closure of the circuit across the last mentioned conductors results in the establishment of the holding circuit for relay 110 through switch 114 and conductor 112. Deenergization of relay 96 results in the opening of switch 97 and closure of switch 98, the former opening the initial energizing circuit for the cam driving motor 99 and the latter closing a holding circuit for the oil valve solenoid 120 extending from conductor 95, switch 113 in its closed position, conductors 115, 116 and 122 and holding resistor 123 in series therewith. Four seconds later (104 seconds from the start) the contact operated by cam O opens but if flame is established the oil valve solenoid remains energized and the oil valve opens as just described. Fourteen seconds after this operation (118 seconds from the start) the contact operated by cam B opens but relay 110 remains energized through the previously described holding circuit including the flame detector in its "run" position. Thirty-six seconds later (154 seconds after the start) the contact operated by cam I opens deenergizing the ignition transformer. Six seconds later the contact operated by cam T opens and the cam driving motor stops with the cam shaft in the normal start position ready for a new start.

The burner unit will continue to operate until shut down by either the thermal control in the enclosure being conditioned or by the high limit switch, or if the high limit switch fails to operate, on a continued increase in temperature by the fan switch, as will be explained more fully hereinafter.

If the oil fails to ignite during the four-second oil supply period, the flame detector is not actuated into engagement with its "hot" contact and consequently relay 96 remains energized holding switch 98 open thus preventing closure of the holding circuit for the oil valve solenoid through conductor 122. The motor compressor 128 continues to run for fourteen seconds until the cam contact B opens, deenergizing relay 110 and opening switch 113 and thereby stopping the motor. The system may be provided with a lock-out ratchet requiring manual resetting after a predetermined number of starting cycles.

The control illustrated also provides protection against operation of the unit if the oil valve leaks and flame occurs before the four-second oil valve supply period by operation of the flame detector from its "cold" position. In this case the relay 96 is deenergized, effecting opening of switch 97, stopping the cam motor (if flame occurs before cam T closes its contacts) and also deenergizing the relay 110, thereby stopping the motor compressor through the opening of switch 113. When the flame detector returns to its "cold" position, relays 96 and 110 are again energized and the starting cycle is resumed at the point of interruption. If the flame detector returns to its "cold" position during the S-cam period the above described operation will be repeated until the S-cam effects opening of its associated contacts. At this time the motor compressor will not start since the starting winding is open. The cam motor will continue to turn when the flame detector reaches the "cold" position and begins a new cycle.

The starting cycle of the furnace cannot be initiated unless the flame detector is in its "cold" position because the relay 96 is energized only when the flame detector is in engagement with its "cold" contact.

After proper initiation of combustion in the combustion chamber the temperature in the plenum chamber 18 rises gradually as the air is heated. Upon a predetermined rise in the air temperature the fan switch 63 is closed, thereby connecting the fan motor 14 directly across conductors 36 through conductors 42, 43 and 50. The fan motor is thereby started and continues to run until the temperature drops to a predetermined lower level.

If, for any reason whatever, the furnace continues to operate without the fan running by failure of the fan motor or the like, or if the air flow is restricted (e. g. by dirty filters) the air temperature in the plenum chamber 18 rises. When it reaches the setting of the limit control the limit switch 62 opens and disconnects the power supply from the burner unit by opening the circuit across conductors 52 and 53 to burner control and thus stop operation of the unit. If, for any reason, the limit control 62 fails to operate as by failure of the thermal actuating element 56 the projection 81 on the fan switch operating arm engages projection 85 and upon a predetermined movement opens the limit switch.

In actual practice the fan switch 63 has been calibrated to close the fan motor circuit at a temperature of 120° F. and open it at 90° F., the limit switch to open at 167° F., and the double excess temperature safety means to operate at 212° F. These values may be changed as desired to suit varying operating conditions.

After the requirements of the space being heated are fulfilled the room thermostat is actuated into engagement with its hot contact H, thereby short-circuiting relay 92 and effecting opening of switches 93 and 94. The opening of switch 94 has the same result as the opening of the high limit switch, that is, the termination of operation of the heating unit.

It is obvious that the present invention provides a very simple and reliable excess temperature safety device. The safety device is not only operated by the limit switch thermal actuating mechanism but is operated even if the latter fails. There is, therefore, only a very slight chance that the unit will be operated under unsafe conditions.

What I claim as new and desire to secure by Letters Patent of the United States, is:

1. In combination, means for heating a medium, means for circulating said medium, first means responsive to the temperature of the medium and having a control device for initiating operation of the circulating means upon a predetermined rise in temperature of the medium, second means responsive to the temperature of the medium and having a control device for terminating operation of said heating means upon occurrence of a predetermined greater temperature rise of said medium, and means operable by said first mentioned means upon an additional temperature rise of said medium for operating the control device of said second means to terminate operation of said heating means.

2. In combination, means for heating a fluid, means for circulating said fluid to an enclosure, means responsive to temperature within said enclosure for controlling operation of the heating means, a high limit thermally actuated switch cooperatively associated with said last mentioned means for preventing operation of the heating means when the temperature of the medium rises above a predetermined value, and thermally actuated means for controlling operation of the circulating means at predetermined lower temperatures of the medium and provided with connections for operating said high limit switch when the temperature of the medium exceeds a predetermined maximum value in excess of the first mentioned value in case the high limit switch remains unactuated by its actuating means.

3. In a conditioning system comprising intermittently operable medium temperature changing means and circulating means, the combination including first means responsive to the temperature of the medium and having a control device for operating said circulating means when the temperature is above a predetermined minimum value, second means responsive to the temperature of the medium and having a control device for terminating operation of said heating means upon an excessive rise in temperature of the medium, and means operable by said first means for operating the control device of said second means to terminate operation of said temperature changing means upon a further increase in temperature and failure of said second means.

4. A temperature control system comprising a furnace having a combustion chamber therein and a heating chamber, means for circulating air through said heating chamber, thermally actuated means in said heating chamber having a control device for controlling said air circulating means, second thermally actuated means in said heating chamber and having a control device for controlling the operation of the furnace, and means actuated by said first thermally actuated means for actuating the control device of said second mentioned thermally actuated means when the temperature within said heating chamber exceeds a predetermined maximum value.

5. In combination, means for heating a medium, means for circulating said medium to an enclosure, means responsive to the temperature within the enclosure for controlling operation of the heating means, means responsive to the temperature of the medium for controlling operation of the circulating means, second means responsive to the temperature of the medium and having a high limit control device for controlling the operation of the heating means upon occurrence of excessive temperature, and means operable by the circulating means controlling means for operating said high limit control device in case the latter fails to operate upon excessive temperature.

6. A temperature control device including in combination a circuit controlling element, an operating arm therefor, thermal responsive means for actuating said arm, a second circuit controlling element, an operating arm therefor, a separate thermal responsive means for actuating said arm, and means operable by said first mentioned thermal responsive means for actuating said second mentioned arm.

7. In combination, a warm air furnace, electrically operated combustion control means therefor, electrically operated means for circulating air through said furnace, a thermostatic switch normally controlling energization of said combustion control means, a normally closed high limit switch in series with said thermostatic switch and having furnace air temperature responsive operating means for opening said limit switch to prevent the energization of said combustion control means whenever the furnace air temperature reaches a predetermined value, an air circulation control switch having separate furnace air temperature responsive operating means for controlling energization of said air circulating means in response to variations in furnace air temperature below said predetermined value, and means operable by said separate air temperature responsive operating means for opening said normally closed high limit switch when the furnace air temperature exceeds said predetermined value.

8. A temperature control device including in combination, a resilient contact carrying element, a rotatable operating arm for actuating said element, thermal responsive means for rotating said arm, a second resilient contact carrying element, a rotatable operating arm for actuating said element, thermal responsive means for rotating said arm, said last mentioned arm being provided with a portion extending into the plane of movement of said first mentioned contact carrying element whereby said second mentioned thermal responsive element may actuate said first mentioned resilient element.

9. A temperature control device including in combination, a resilient contact carrying element, provided with a projecting portion, a rotatable operating arm for actuating said element, thermal responsive means for rotating said arm, a second resilient contact carrying element, a rotatable operating arm for actuating said element, thermal responsive means for rotating said arm, the last mentioned arm being provided with a portion extending into the plane of movement of the projection on said first mentioned contact carrying element whereby said second mentioned thermal responsive element may actuate the first mentioned resilient element.

10. A temperature control device including in combination a circuit controlling element, an operating arm therefor, a thermal responsive element for actuating said arm and arranged normally to maintain said element in circuit opening position and to actuate said element into circuit closing position upon a rise in temperature to a first value, a second circuit controlling element normally biased to a closed position, an operating arm therefor, a thermal responsive element for actuating said arm and arranged to actuate said element into circuit opening position upon a rise in temperature above a second value higher than the first, and means operable by said first mentioned thermal responsive means for actuating said second mentioned element upon a rise in temperature to a value higher than the previously mentioned values.

11. In combination, means for heating a medium, means for circulating said medium, means including a circuit controlling element, an operating arm therefor and thermal-responsive means adapted to actuate said arm for initiating operation of the circulating means upon a predetermined rise in temperature of the medium, means including a second circuit controlling element, an operating arm therefor and thermal-responsive means adapted to actuate said arm for terminating operation of said heating means upon an excessive temperature rise of said medium, and means operable by said first mentioned thermal-responsive means for actuating said second mentioned circuit controlling element upon a further rise in temperature and failure of said first mentioned thermal-responsive means to actuate said element.

12. In combination, means for heating a medium, means for circulating said medium, means including a resilient contact carrying element, a rotatable operating arm for actuating said element and thermal-responsive means adapted to rotate said arm for initiating operation of said circulating means upon a predetermined rise in temperature of the medium, means including a second resilient contact carrying element, a rotatable operating arm for actuating said element, and thermal-responsive means adapted to rotate said arm for terminating operation of said heating means upon an excessive temperature rise of said medium, said last mentioned arm being provided with a portion extending into the plane of movement of said first mentioned contact carrying element whereby said second mentioned thermal-responsive means may actuate said first mentioned resilient element under predetermined conditions.

HARRY R. CRAGO.